United States Patent
Doty et al.

(10) Patent No.: US 6,772,781 B2
(45) Date of Patent: Aug. 10, 2004

(54) APPARATUS AND METHOD FOR MIXING GASES

(75) Inventors: Dean L. Doty, Plano, TX (US); Yan Xu, Houston, TX (US); Stephen Chesters, Allen, TX (US); Ben R. Hall, Mesquite, TX (US); Roger Q. Petton, Dallas, TX (US); Thomas P. Ross, Mesquite, TX (US); Charles A. White, Red Oak, TX (US); Reginald Wynne, Blue Island, IL (US)

(73) Assignee: Air Liquide America, L.P., Houston, TX (US)

( * ) Notice: Subject to any disclaimer, the term of this patent is extended or adjusted under 35 U.S.C. 154(b) by 0 days.

(21) Appl. No.: 09/764,424

(22) Filed: Jan. 19, 2001

(65) Prior Publication Data

US 2001/0032668 A1 Oct. 25, 2001

Related U.S. Application Data

(60) Provisional application No. 60/180,462, filed on Feb. 4, 2000.

(51) Int. Cl.$^7$ .............................................. E03B 1/00
(52) U.S. Cl. ............................ 137/9; 137/597; 137/607
(58) Field of Search ......................... 137/88, 93, 597, 137/101.19, 101.21

(56) References Cited

U.S. PATENT DOCUMENTS

| | | | | |
|---|---|---|---|---|
| 2,868,216 A | * | 1/1959 | Robertson | 137/13 |
| 5,368,062 A | * | 11/1994 | Okumura et al. | 137/240 |
| 5,470,390 A | * | 11/1995 | Nishikawa et al. | 118/719 |
| 5,823,219 A | * | 10/1998 | Purvis et al. | 137/5 |
| 5,826,607 A | * | 10/1998 | Knutson et al. | 137/1 |
| 5,865,206 A | | 2/1999 | Steigman et al. | 137/7 |
| 5,887,611 A | * | 3/1999 | Lampotang et al. | 137/101.19 |
| 5,950,675 A | | 9/1999 | Minami et al. | 137/606 |

* cited by examiner

Primary Examiner—Stephen M. Hepperle
(74) Attorney, Agent, or Firm—Linda K. Russell; Elwood L. Haynes

(57) ABSTRACT

Provided are apparatuses and methods for mixing gases. The apparatuses are suitable for use in the manufacture of an electronic device. The apparatuses include a gas mixing manifold. A first, bulk gas source is connected to introduce a flow of a first gas to the manifold. A second gas source is connected to introduce a flow of a second gas to the manifold. The first and second gases are mixed in the manifold, thereby forming a gas mixture. A conduit is connected to one or more point of use for introducing a flow of the gas mixture thereto. The present invention is particularly applicable in the semiconductor manufacturing industry.

6 Claims, 3 Drawing Sheets

| VALVE # | DESCRIPTION |
|---|---|
| PCV1 | REGULATOR 1/4" |
| PCV2 | REGULATOR 1/2" |
| PCV3 | REGULATOR (LINE REG.) |
| PCV4 | REGULATOR (CYL. REG.) |
| PCV5 | REGULATOR (LINE REG.) |
| PV1 | PNEUMATIC VALVE 1/2" |
| PV2 | PNEUMATIC VALVE 1/2" |
| PV3 | PNEUMATIC VALVE 1/4" |
| PV4 | PNEUMATIC VALVE 1/2" |
| PV5 | PNEUMATIC VALVE 1/4" |
| PV6 | PNEUMATIC VALVE 1/4" |
| PV7 | PNEUMATIC VALVE 1/4" |
| PV8 | PNEUMATIC VALVE 1/4" |
| PV9 | PNEUMATIC VALVE 1/4" |
| PV10 | PNEUMATIC VALVE 1/4" |
| PSV1 | PNEUMATIC 3-WAY VALVE 1/4" |
| PSV2 | PNEUMATIC 3-WAY VALVE 1/4" |
| PRV1 | PRESSURE RELIEF CHECK VALVE 1/4" |
| FCV1 | METERING VALVE (FLOW CONTROL) 1/4" |
| FS1 | VERTICAL FLOW SENSOR 1/4" |
| FS2 | VERTICAL FLOW SENSOR 1/4" |
| MV1 | MANUAL VALVE 1/4" NUPRO |
| MV2 | MANUAL VALVE 1/2" NUPRO |
| MV3 | MANUAL VALVE 1/2" NUPRO |
| MV4 | MANUAL VALVE 1/4" WHITEY |
| MV5 | MANUAL VALVE 1/4" WHITEY |
| MV6 | MANUAL VALVE 1/4" WHITEY |
| MV7 | MANUAL VALVE 1/4" WHITEY |
| MV8 | MANUAL VALVE 1/4" WHITEY |
| MV9 | MANUAL VALVE 1/4" NUPRO |
| CV1 | CHECK VALVE 1/4" |
| CV2 | CHECK VALVE 1/2" |
| CV3 | CHECK VALVE 1/4" |
| CV4 | CHECK VALVE 1/4" |
| CV5 | CHECK VALVE 1/4" |
| F1 | FILTER (H2) 1/4" |
| F2 | FILTER (N2) 3/8"-1/2" |
| F3 | FILTER (H2/N2) 3/8"-1/2" |
| PIT-101 | TRANSDUCER (H2) |
| PIT-102 | TRANSDUCER (H2) |
| PIT-201 | TRANSDUCER (N2) |
| PIT-202 | TRANSDUCER (N2) |
| PI-103 | GAUGE (H2) |
| PI-203 | GAUGE (N2) |
| PI-303 | GAUGE (H2/N2) |
| MFC1 | H2 |
| MFC2 | N2 |
| - | BUFFER VESSEL |

*FIG. 2B*

APPARATUS AND METHOD FOR MIXING GASES

CROSS REFERENCE TO RELATED APPLICATION

This application claims under 35 U.S.C. §119(e) the benefit of provisional application Ser. No. 60/180,462, filed Feb. 4, 2000, the contents of which application are incorporated herein by reference.

BACKGROUND OF THE INVENTION

1. Field of the Invention

This invention relates to apparatuses and methods for mixing gases. The apparatuses and methods can be used for mixing, for example, hydrogen and nitrogen gases. The invention has particular applicability to the manufacture of an electronic device.

2. Description of the Related Art

Mixtures of gases are used in a wide range of industries for various purposes. For example, mixtures of high-purity gases are typically used in the semiconductor manufacturing industry for processing semiconductor substrates. High-purity gases include, for example, in a nitrogen and hydrogen gas mixture, less than about 100 ppb of water and less than about 100 ppb of oxygen impurities.

Gas mixtures are commonly provided by automatic gas panel systems. Typical gas panel systems receive a gas mixture from high-pressure gas cylinders. Although automatic gas panel systems that utilize such gas cylinders have been subject to improvements, use thereof typically presents several disadvantages. For example, the purity levels of the gas mixtures provided therefrom can be inconsistent. In addition, monitoring and maintenance of the gas panel systems that utilize gas cylinders can be time consuming and costly. For example, maintenance of gas panel systems that utilize gas cylinders typically requires replacing used gas cylinders on a frequent basis, cycle purging cylinder connections to reduce or prevent atmospheric contamination, manually setting the gas cylinders in an on-line apparatus, and monitoring gas cylinder and delivery pressures.

In addition, the use of gas panel systems that utilize gas cylinders can be susceptible to human error. For example, replacing empty gas cylinders is typically a repetitious procedure. Problems can arise with incorrectly adjusted cylinder valves, process delivery valves and/or regulators. Further, the cost of operating automatic gas panel systems that utilize gas cylinders can be significant. The various potential problems with using gas panel systems can cause process interruptions which can be extremely costly, especially in the semiconductor manufacturing industry.

In addition to automatic gas panel systems, manual mixers can be used to provide gas mixtures. Manual mixers for producing oxygen and helium mixtures and nitrogen and hydrogen mixtures have been designed and operated by Air Liquide Corporation located in Dallas, Tex. Such manual mixers typically require close monitoring during the operation and maintenance thereof.

Low-purity gas mixers are also used to provide gas mixtures in applications which do not require a high-purity level, for example, welding applications. Low-purity gas mixers are available, for example, from Thermco Instrument Company located in Laporte, Ind. Low-purity gas mixers typically employ gas analyzers to monitor the blend ratio of the gases in the mixer. However, these gas mixers are unable to provide gas mixtures of high-purity such as the gas mixtures as required in the semiconductor manufacturing industry.

In view of the foregoing, there is a need in the art for gas mixing apparatuses and methods that overcome the disadvantages of current gas mixing devices discussed above, and especially for provision of high-purity and/or ultra-high-purity gas mixtures.

Accordingly, it is an object of the present invention to provide apparatuses and methods for mixing gases that reduce or eliminate the use of gas cylinders.

The apparatuses and methods for mixing gases in accordance with the invention can reduce the amount of monitoring and operator input during use thereof, and can provide a gas mixture having an increased consistency in mixture concentration. Furthermore, the apparatuses and methods for mixing gases in accordance with the invention can reduce or eliminate the occurrence of back diffusion of gases.

Other objects and aspects of the present invention will become apparent to one of ordinary skill in the art upon review of the specification, drawings and claims appended hereto.

SUMMARY OF THE INVENTION

The foregoing objects are met by the apparatuses and methods of the present invention. According to a first aspect of the present invention, an apparatus for mixing gases is provided, suitable for use in the manufacture of an electronic device. The apparatus comprises:

(a) a gas mixing manifold;
(b) a first, bulk gas source connected to introduce a flow of a first gas to the manifold;
(c) a second gas source connected to introduce a flow of a second gas to the manifold, wherein the first and second gases are mixed in the manifold, thereby forming a gas mixture; and
(d) a conduit connected to one or more point of use for introducing a flow of the gas mixture thereto.

According to a further aspect of the present invention, a method for mixing gases is provided, suitable for use in the manufacture of an electronic device. The method comprises the steps of:

(a) providing a gas mixing manifold;
(b) introducing a flow of a first gas to the manifold from a first, bulk gas source;
(c) introducing a flow of a second gas to the manifold from a second gas source, wherein the first and second gases are mixed in the manifold, thereby forming a gas mixture; and
(d) introducing a flow of the gas mixture to one or more point of use.

BRIEF DESCRIPTION OF THE DRAWINGS

The objects and advantages of the invention will become apparent from the following detailed description of the preferred embodiments thereof in connection with the accompanying drawings in which:

FIG. 2B is a description of the various elements depicted in FIG. 2A.

DETAILED DESCRIPTION OF THE PREFERRED EMBODIMENTS OF THE INVENTION

Figure 1:
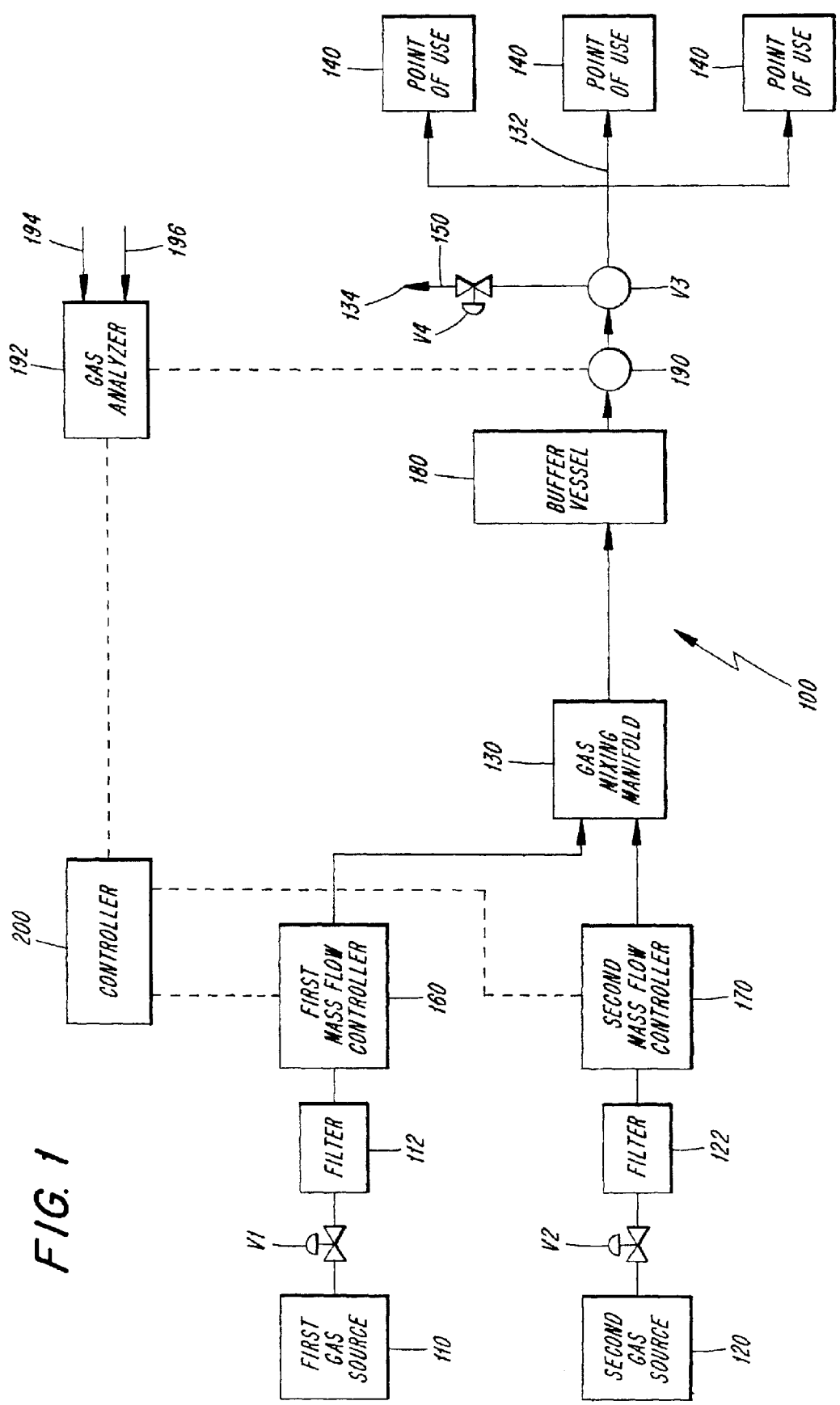
FIG. 1 is a schematic diagram of an exemplary gas mixing apparatus, according to one aspect of the present invention.

Referring to FIG. 1, a gas mixing apparatus 100 produces a flow of a gas mixture. The gas mixture can be used in various applications, preferably an application that requires a gas mixture of ultra-high purity. For example, the flow of the gas mixture is preferably provided to one or more point of use 140, such as a semiconductor processing tool. The semiconductor processing tool can be, for example, a chemical vapor deposition, etching, diffusion, oxidation, sputtering or rapid thermal processing system. In such systems, the gas mixture can be used as a process gas which contacts the wafer(s) being treated, or as a purge gas. Alternatively, the gas mixture can be used to provide a controlled atmosphere in which a process tool operates, such as a wafer stepper gas.

The flow of the gas mixture from the gas mixing apparatus 100 to the one or more point of use 140 is typically continuous. However, the flow may be interrupted for particular purposes such as, for example, maintenance, quality control and/or safety purposes.

The apparatus 100 produces a gas mixture comprising at least two gases. For example, the apparatus 100 can produce, but is not limited to producing, a gas mixture comprising the following gases: nitrogen and hydrogen; oxygen and helium; nitrogen and oxygen (e.g., synthetic air); methane and argon; mixtures of inert gases; and mixtures of combustion gases such as fuel gases. In a preferred embodiment, the apparatus 100 is used to produce a gas mixture typically suitable for use in a semiconductor processing tool, and is preferably comprising nitrogen and hydrogen.

The gas mixture produced by the apparatus 100 is of ultra-high-purity. For example, the apparatus 100 preferably produces a nitrogen and hydrogen gas mixture that includes less than about 5 ppb water and less than about 2 ppb oxygen impurities. Oxygen/helium and nitrogen/oxygen gas mixtures can be produced containing about 10 ppb water or less. The purity level of the gas mixture typically depends on the composition of the gas mixture and the particular application of the gas mixture.

The apparatus 100 can effectively provide a gas mixture having an increased consistency in mixture concentration. For example, in a hydrogen and nitrogen mixture in which the intended hydrogen concentration is 3% by volume and the nitrogen concentration is 97% by volume of the mixture, the apparatus 100 can typically maintain the hydrogen concentration of the mixture at about 3%±0.15% by volume of the mixture.

The apparatus 100 includes a first gas source 110 that is connected to introduce a flow of a first gas or gas mixture into a gas mixing manifold 130. A second gas source 120 is connected to introduce a flow of a second gas or gas mixture into the gas mixing manifold 130. The flows of the first and second gases into the gas mixing manifold are preferably continuous. Valves V1 and V2 are normally in an open position to permit flow of the first and second gases therethrough, respectively. The first and second gases are mixed in the gas mixing manifold 130, thereby forming a gas mixture. The first and second gas sources 110 and 120 are preferably located on-site, for example, at a semiconductor manufacturing facility.

The first gas source 110 is a bulk gas source. For example, the bulk gas source can have a volume from about 40,000 ft$^3$ (1,130,000 liters) to about 20,000,000 ft$^3$ (5.66×10$^8$ liters), preferably from about 1,000,000 ft$^3$ (2.83×10$^7$ liters) to about 10,000,000 ft$^3$ (2.83×10$^8$ liters). The bulk gas source can include, for example, a bulk gas container located on a semiconductor manufacturing facility, or a gas-transporting tube trailer. The tube trailer typically has a volume from about 40,000 ft$^3$ (1,130,000 liters) to about 140,000 ft$^3$ (3,960,000 liters). The bulk gas source typically can provide a gas of higher purity than gases provided from non-bulk sources such as, for example, gas cylinders. The aforementioned disadvantages of using conventional gas cylinders are avoided or conspicuously ameliorated by using a bulk gas source to supplement or replace a gas cylinder. As used herein, the term "gas cylinder" includes a gas container having a volume that is less than the volume of the bulk gas source, for example, from about 220 ft$^3$ (6230 liters) to about 300 ft$^3$ (8500 liters).

The second gas source 120 preferably is also a bulk gas source, as set forth above. In an alternative embodiment, the second gas source can be a non-bulk gas source such as, for example, a gas cylinder.

The apparatus 100 can produce a flow of a gas mixture over a wide flow rate range. The flow rates of the flows of the first and second gases depend at least on the amount of gas mixture product desired and/or the desired concentration of the first and second gases in the gas mixture. In a preferred embodiment, the combined flow rate of the first and second gases is from about 10 lpm (liters per minute) to about 400 lpm.

The first and second gases are mixed in the gas mixing manifold 130, typically on a continuous basis. The gas mixing manifold 130 is preferably suitable for preparing a gas mixture for use in a semiconductor processing application. The apparatus 100 includes at least one conduit 132 through which a flow of the gas mixture can be delivered to one or more point of use 140.

The gas mixing manifold 130 is preferably connected to introduce the flow of the gas mixture to a point of use 140. Alternatively, in a less preferred embodiment, the apparatus 100 can be employed for gas cylinder filling for later use. As discussed above, the point of use 140 can be, for example, a semiconductor processing tool, in which the gas can be employed, for example, as a process gas or a purge gas.

Under normal process conditions, the point of use 140 receives a continuous flow of the gas mixture from the gas mixing manifold 130. Under particular process conditions, however, the flow of the gas mixture to the point of use 140 is stopped. Such process conditions can include, for example, the non-operation of the point of use 140, such as when a semiconductor processing tool is shut down for maintenance or production is otherwise stopped, and/or when the produced gas mixture does not comply with desired specifications. The flow can be stopped by closing normally-opened three-way valve V3 such that the flow to the point of use 140 is stopped.

According to a preferred embodiment of the present invention, the apparatus 100 can also include a gas vent conduit 150 connected to remove a continuous flow of the gas mixture from the gas mixing manifold 130. The gas vent conduit 150 is preferably arranged upstream of the one or more point of use 140. By use of vent conduit 150, the other gas flows in the apparatus 100 can flow continuously such as, for example, the flows of the first and second gases from the first and second gas sources 110 and 120. This conspicuously ameliorates or eliminates the presence of "dead legs," i.e., sections of stagnant gas, in the apparatus 100. Thus, gas contamination due to the presence of such "dead legs" is reduced or eliminated. In addition, maintaining a continuous flow from the gas mixing manifold 130 reduces or eliminates the potential for back diffusion into the first and/or second gas sources 110 and 120.

In instances when the flow to the point of use 140 is shut off, flow through the gas vent conduit 150 continues so as to maintain a continuous flow of the gas mixture through the apparatus 100. Valve V4 preferably remains open to permit continuous flow of the gas mixture through vent conduit 150. The gas mixture flowing through the vent conduit 150 is typically not used as a product, although it can be. The gas vent conduit 150 is preferably connected to the general exhaust area of a semiconductor manufacturing facility.

In an alternative embodiment, flow of the gas mixture through the gas vent conduit 150 is shut off when a flow of the gas mixture is being introduced to the point of use 140. In this embodiment, flow passes through the gas vent conduit 150 only when the flow of the gas mixture to the point of use 140 is stopped. This reduces or eliminates the amount of gas mixture lost through the gas vent conduit 150. Preferably, the flow through the gas vent conduit 150 is automatically switched on when the flow to the point of use 140 is stopped. Equipment and techniques known in the art can be used for sensing the stoppage of flow to the point of use 140 and for switching on the flow through the gas mixture conduit 150.

According to a preferred embodiment, the flow rate of the mixed gas through the gas vent conduit 150 can be regulated to maintain a sufficient pressure within the apparatus 100. At the same time, the flow can be regulated so that an excessive amount of the gas mixture product is not lost through the gas vent conduit 150. Particular components of the apparatus 100 such as, for example, the first and second mass flow controllers 160 and 170, typically require a specified minimum amount of gas flow therethrough. Therefore, the flow rate through the gas vent conduit 150 is preferably sufficiently high to maintain the specified minimum amount of gas flow through the apparatus 100, particularly when the flow to the point of use 140 is stopped.

The flow rate of the gas mixture through the gas vent conduit 150 is typically at least about 20 lpm, more preferably from about 10 lpm to about 50 lpm, most preferably about 33 lpm. The concentration of the gas mixture flowing through the gas vent conduit 150 typically meets the desired concentration specifications of the gas mixture product. Therefore, the apparatus 100 can immediately provide a flow of the gas mixture that meets specifications when the flow to the point of use 140 is reinstated.

The present invention is not limited to providing a mixture of gases from two gas sources. For example, in an alternative embodiment, the apparatus 100 produces a gas mixture from three or more gas sources. This embodiment includes at least one additional gas source (not shown) that is connected to introduce a flow of at least one additional gas or gas mixture into the gas mixing manifold 130. The at least one additional gas source typically comprises a gas or a mixture of gases that is different from the gases of the first and second gas sources.

The temperatures and pressures of the gases through the apparatus typically depend upon the types of gases used and/or the particular application of the gas mixture. For example, in the production of a nitrogen and hydrogen gas mixture, the pressure of the nitrogen gas flow is preferably about 110 psig, and the pressure of the hydrogen gas flow is preferably about 120 psig. The apparatus 100 can optionally include one or more regulator that adjusts the pressure of the gas flow provided by the first and/or second gas sources 110 and 120.

According to a preferred embodiment, the flow rate of the first and second gases can be regulated by first and second mass flow controllers 160, 170. The flow rates depend, for example, on the desired flow rate of the gas mixture product stream, the desired concentrations of the first and second gases of the gas mixture, and the particular application of the gas mixture. For example, to produce a nitrogen and hydrogen gas mixture for use with a semiconductor processing tool, the flow rate of nitrogen is preferably about 194 lpm and the flow rate of hydrogen is preferably about 6 lpm.

The gas mixture exiting the gas mixing manifold 130 can optionally be introduced to a buffer vessel 180. The buffer vessel 180 functions as a container for the gas mixture product, and is formed of a material suitable for containing the gas mixture such as, for example, 316 L electro-polished stainless steel. In a preferred embodiment, the buffer vessel 180 has a volume of about 25 gallons (94.6 liters). The gas mixture can be removed from the buffer vessel 180 and introduced to the point of use 140.

The gas conduits of the apparatus 100 are also formed of a material suitable for containing the gases that flow therethrough, for example, 316 L electro-polished stainless steel tubing. The size of the conduits typically depend on the amount of gas flow therethrough. For example, 0.5 inch (1.27 cm) tubing is typical. Such tubing typically has an inside diameter of about 0.402 inch (1.02 cm).

At least one filter can optionally be included in the apparatus 100 to reduce the level of impurities in the gas mixture product. For example, according to a preferred embodiment, the apparatus 100 can optionally include filters 112 and 122 to reduce the amount of impurities in the gas flows introduced from the first and second gas sources 110 and 120, respectively.

The apparatus 100 can optionally include a controller 200 which can adjust the concentration of the gas mixture, for example, by monitoring and controlling the flow rates of the first and/or second gases. The controller 200 can adjust the concentration of the gas mixture by adjusting at least one of the mass flow controllers 160 and 170. Suitable controllers and control methods are known to those skilled in the art. The controller 200 can be, for example, a programmable logic controller (PLC).

According to a preferred embodiment, the controller 200 can be programmed to provide a gas mixture having a desired concentration by adjusting at least one of the mass flow controllers 160 and 170. A detector 190 and a gas analyzer 192 can measure the concentration of at least one gas in the gas mixture and can provide this information to the controller 200. Preferably, the concentration of the gas mixture is measured proximate to the point of use 140. For example, in a preferred embodiment, the controller 200 can determine the concentration of the first and second gases in the gas mixture, preferably nitrogen and hydrogen. One or both of the first and second mass flow controllers 160, 170 can then be adjusted to regulate the overall concentration of the gas mixture.

At least one additional sensor and/or detector (not shown) can measure various characteristics of the gases flowing through the conduits of the present apparatus 100 including, for example, pressure, flow rate, temperature and/or concentration of the gases. The information from the additional sensor(s) and/or detector(s) can be received and processed by the controller 200. The controller 200 can also provide a data report that includes, for example, information relating to the various pressures, flow rates, temperatures, and gas mixture concentrations of the gases within the apparatus 100. The status of the apparatus 100 can be monitored from a remote location, thereby reducing or eliminating the need for daily monitoring through human interaction.

In a preferred embodiment, the gas analyzer 192 is a hydrogen gas analyzer such as, for example, the AT-401 percent hydrogen analyzer available from Thermco Instrument Company located in Laporte, Ind. The gas analyzer 192 is typically connected to receive a flow of a span gas, i.e., a reference gas, from a span gas conduit 194. The span gas is typically used to calibrate the gas analyzer 192. The concentration of the span gas typically corresponds to the desired concentration of the gas mixture product. The gas analyzer 192 is also typically connected to receive a flow of a purge gas from a purge gas conduit 196. The purge gas can be, for example, nitrogen.

Gas sources in semiconductor processing facilities sometimes provide gas flows at inconsistent flow rates. The apparatus 100 can optionally compensate for the inconsistent flow rates. For example, the controller 200 or a different controller (not shown) can adjust the flow rate(s) of the gases received from the first and/or second gas sources 110 and 120 to within a specified tolerance range. Control methods and equipment that are known in the art can be used with the controller 200.

In order to further illustrate the present invention and the advantages thereof, the following specific example is given, it being understood that the example is intended only as illustrative and in no way limiting.

EXAMPLE

N₂ and H₂ Gas Mixing System

Figure 2A:
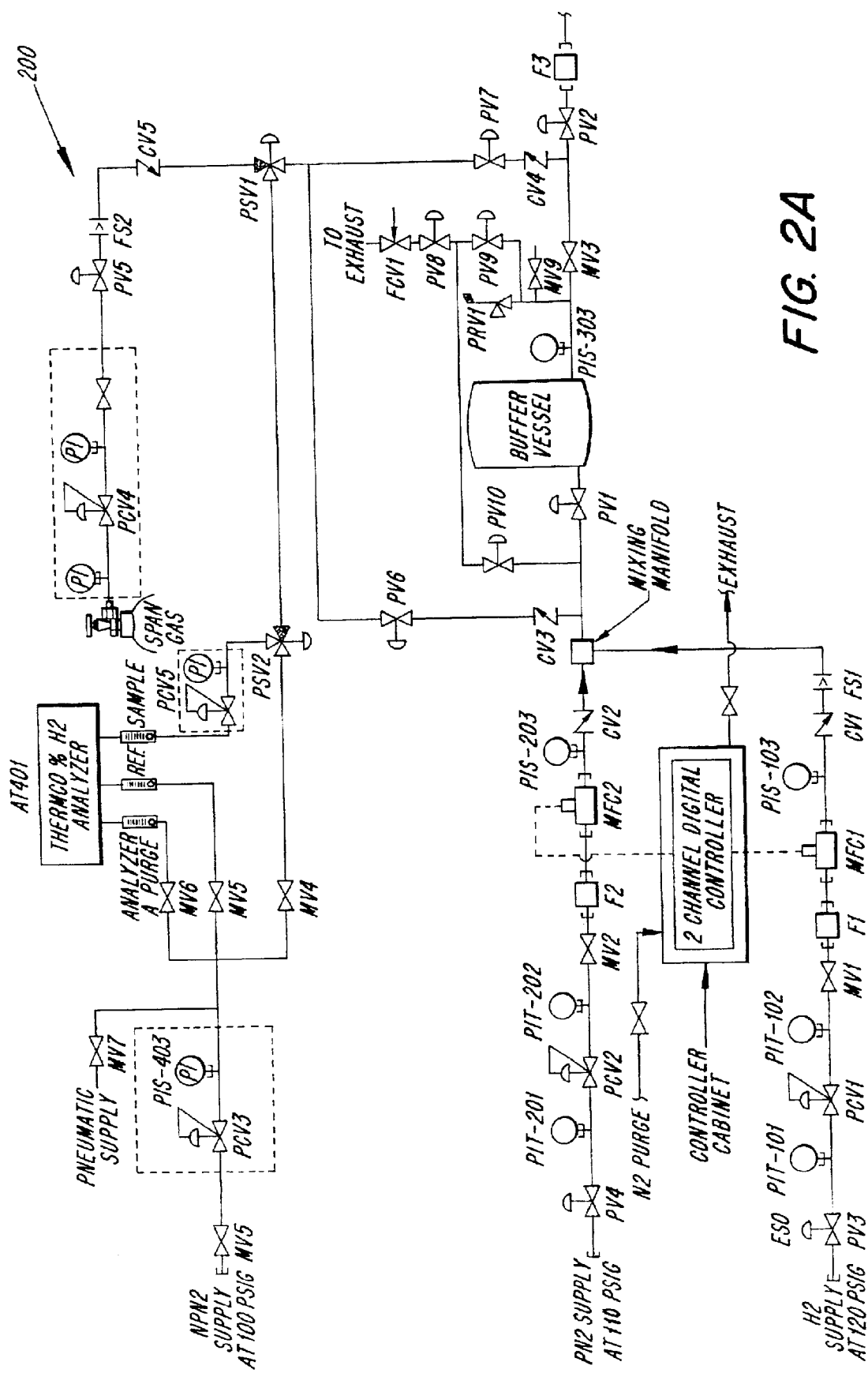
FIG. 2A is a schematic diagram of an exemplary gas mixing apparatus, according to another aspect of the present invention.

Referring to FIG. 2, an exemplary embodiment of the present invention will now be described. The system 200 produces a nitrogen and hydrogen gas mixture. A flow of ultra-high-purity nitrogen gas at 110 psig flows through pneumatic valve PV4, transducer PIT-201, regulator PCV2, transducer PIT-202, manual valve MV2, filter F2, mass flow controller MFC2, check valve CV2, and into the mixing manifold. A flow of ultra-high-purity hydrogen gas at 120 psig flows through pneumatic valve PV3, transducer PIT-101, regulator PCV1, transducer PIT-102, manual valve MV1, filter F1, mass flow controller MFC1, check valve CV1, vertical flow sensor FS1, and into the mixing manifold. The gas mixture is removed from the mixing manifold and flows through pneumatic valve PV1, a buffer vessel, gauge PIS-303, manual valve MV3, pneumatic valve PV2, and filter F3 to the point of use.

A portion of the gas mixture flows to the check valve CV3, through pneumatic valve PV6, pneumatic 3-way valve PSV1, pneumatic 3-way valve PSV2, regulator PCV5, and into the percent hydrogen analyzer AT401. A span gas flows through regulator PCV4, pneumatic valve PV5, vertical flow sensor FS2, check valve CV5, pneumatic 3-way valve PSV1, pneumatic 3-way valve PSV2, manual valve MV4, manual valve MV6, and into the percent hydrogen analyzer AT401. Nitrogen purge gas flows through regulator PCV3, manual valve MV5, and into the percent hydrogen analyzer AT401.

A portion of the gas mixture flows to the pressure relief check valve PRV1, through pneumatic valve PV9, pneumatic valve PV8, and regulator PCV1. The regulator PCV1 functions as a metering valve for controlling the flow of the gas mixture. This series of components provides a continuous vent of the gas mixture.

In this exemplary embodiment, the gas supply lines with an inside diameter of 0.402 inch (1.02 cm), have a length of 200 feet (61 m), and are made of 316 L stainless steel electro-polished tubing. A 0.5 inch (1.27 cm) inside diameter, 316 L stainless steel electro-polished tubing submain is used as the gas mixture conduit. The gas mixture conduit supplies existing gas supply lines with the gas mixture. The submain is 800 feet (243.8 m) in length. The submain includes future valves which provide points at which additional lines can be installed. A total of 60 feet (18.3 m) of 0.375 inch (0.953 cm) 316 L stainless steel electro-polished tubing is used to connect the submain to the existing gas supply lines.

While the invention has been described in detail with reference to specific embodiments thereof, it will be apparent to one skilled in the art that various changes and modifications can be made, and equivalents employed, without departing from the scope of the claims.

What is claimed is:

1. An apparatus for mixing gases, suitable for use in the manufacture of an electronic device, comprising:
   (a) a gas mixing manifold;
   (b) a first, bulk gas source connected to introduce a flow of a first gas to the manifold;
   (c) a second gas source connected to introduce a flow of a second gas to the manifold, wherein the first and second gases are mixed in the manifold, thereby forming a gas mixture;
   (d) a conduit connected to one or more point of use for introducing a flow of the gas mixture thereto; and
   (e) a gas mixture vent conduit arranged upstream of the one or more point of use for removing a flow of the gas mixture from the apparatus, wherein the gas mixture vent conduit maintains the continuous flow of the first and second gases when the gas mixture is not introduced to the one or more point of use.

2. A method for mixing gases, suitable for use in the manufacture of an electronic device, comprising:
   (a) providing a gas mixing manifold;
   (b) introducing a flow of a first gas to the manifold from a first, bulk gas source;
   (c) introducing a flow of a second gas to the manifold from a second gas source, wherein the first and second gases are mixed in the manifold, thereby forming a gas mixture; and
   (d) introducing a flow of the gas mixture to one or more point of use
   (e) continuously removing the gas mixture form the gas mixing manifold via a gas mixture vent conduit arranged upstream of the one or more point of use.

3. The method of claim 2, wherein the gas mixture vent conduit maintains the continuous flow of the first and second gases when the gas mixture is not introduced to the one or more point of use.

4. An apparatus for mixing gases, suitable for use in the manufacture of an electronic device, consisting of:
   (a) a gas mixing manifold;
   (c) a first, bulk gas source connected to introduce a flow of a first gas to the manifold;
      a. a second gas source connected to introduce a flow of a second gas to the manifold, wherein the first and second gases are mixed in the manifold, thereby forming a gas mixture;
      b. a conduit connected to one or more points of use for introducing a flow of the gas mixture thereto; and
      c. a gas mixture vent conduit arranged upstream of the one or more points of use for removing a flow of the gas mixture from the apparatus, wherein the gas mixture vent conduit maintains the continuous flow of the first and second gases when the gas mixture is not introduced to the one or more points of use.

5. A method for mixing gases, suitable for use in the manufacture of an electronic device, consisting of:
   (a) providing a gas mixing manifold;
   (b) introducing a flow of a first gas to the manifold from a first, bulk gas source;
   (c) introducing a flow of a second gas to the manifold from a second gas source, wherein the first and second gases are mixed in the manifold, thereby forming a gas mixture;
   (d) introducing a flow of the gas mixture to one or more points of use, and
   (e) continuously removing the gas mixture from the gas mixing manifold via a gas mixture vent conduit arranged upstream of the one or more points of use.

6. The method of claim 5, wherein the gas mixture vent conduit maintains the continuous flow of the first and second gases when the gas mixture is not introduced to the one or more points of use.

* * * * *